UNITED STATES PATENT OFFICE.

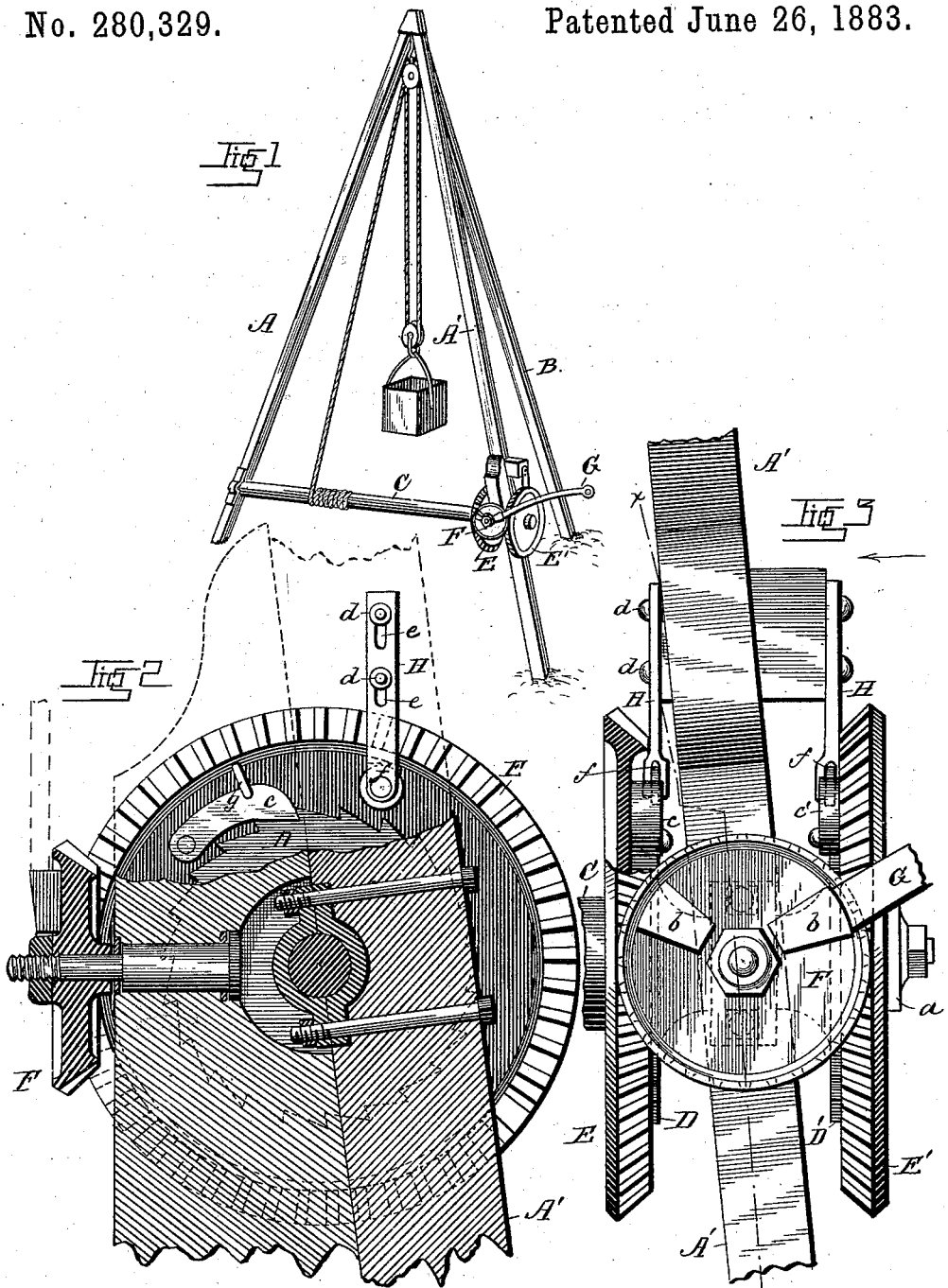

SAMUEL T. RICHARDSON, OF BALTIMORE, ASSIGNOR OF ONE-HALF TO J. HOOPER SHEPHERD, OF CAMBRIDGE, MARYLAND.

HOISTING-GIN.

SPECIFICATION forming part of Letters Patent No. 280,329, dated June 26, 1883.

Application filed May 18, 1883. (No model.)

*To all whom it may concern:*

Be it known that I, SAMUEL T. RICHARDSON, of Baltimore city, and State of Maryland, have invented a new and useful Improvement in Hoisting-Gins; and I do hereby declare that the following is a full, clear, and exact description of the same, reference being had to the accompanying drawings, forming part of this specification, in which—

Figure 1 is a perspective view of a hoisting-gin constructed in accordance with my invention. Fig. 2 is a sectional view on an enlarged scale, taken through the line $x\ x$ of Fig. 1, and looking in the direction of the arrow; and Fig. 3 is an enlarged side view of the gears shown in Fig. 1.

My invention relates to hoisting-gins which are in the nature of three pieces of timber jointed together at the top and spread apart at the bottom, and provided with a block and tackle slung from the top, and a drum or roller journaled in two of said upright timbers, upon which drum or roller the rope is wound up from the tackle for the purpose of raising heavy weights.

The object of my invention is to provide a rapid and easy means for raising the weight by the continuous movement of the drum or roller, and lowering said weight to its proper support when raised to a sufficient height.

In the drawings, A A' B are the three upright timbers of the gin, which are jointed together at the top, and from the upper portion of which is slung a block and tackle, as usual.

C is the roller for winding up the rope, which roller is journaled in the two upright timbers A A'. At one end of this roller, and inside the upright A', there is a ratchet-wheel, D, keyed or otherwise made fast to the journal of the roller, and between it and the end of the roller is a loose bevel-wheel, E. On the other side of the upright A' is another ratchet-wheel, D', keyed fast to the journal of the roller, and between it and a collar, $a$, on the end of said journal, is a loose bevel-wheel, E'.

F is an intermediate bevel-wheel journaled on a pin or short shaft projecting from the upright A at right angles to the roller-axis. This bevel-wheel meshes with both the gear-wheels E E', and is provided with sockets $b\ b$ for detachable hand-levers G.

On the inner face of each bevel-gear wheel E E' there are pivoted one or more pawls or dogs, $c\ c'$, which rest on the ratchet-wheels and drop into engagement therewith by gravity. Both these pawls or dogs point or work in the same direction, and their action is as follows: The rope being connected to the roller C, the intermediate bevel-wheel, F, is oscillated by the hand-lever. As it moves in one direction one of the wheels, E, and its pawl $c$ are made to act against the ratchet-teeth D and turn the roller forward, and as the wheel F is moved in the other direction the other wheel, E', with its pawl $c'$, is made to continue the motion of the roller forward by turning the ratchet-wheel D', which is rigidly connected to said roller, and during this movement the first-mentioned wheel, E, with its pawl, is drawn back for a new position; and so by the oscillation of gear-wheel E it will be seen that a continuous motion in the same direction is given to the roller C. Now, to permit the roller to be unwound with the strain of the weight upon it, a slide-bar, H, is connected to the upright A' by bolts $d$, passing through slots $e$, and this bar carries at its lower end a roller, $f$, which rests in the plane of the pawl. A spring, $g$, is also provided for the pawl, which spring is attached to the flange of the wheel E. The other wheel, E', is similarly equipped with a slide-bar, H, with roller $f$ and a spring for the pawl. Now, in the forward movement of the roller, in winding up the rope, the springs $g$ are disconnected from the pawls, and the slide-bars H, with their rollers, are adjusted up out of range of contact with the pawls in their movement, so that the pawls act simply by gravity to urge the ratchet-wheels alternately forward, giving a continuous forward motion to the shaft to which they are attached. When, however, the load is to be lowered and the roller turned backward to pay out the rope, the spring $g$ is connected to the flange of the wheel, so as to hold the pawls normally away from the ratchet-wheels, and the slide-bars H, with their rollers $f$, are adjusted down, so that the pawls $c\ c'$ strike them, and are thereby forced into engagement with the ratchet-teeth. The same movement of the hand-lever G which formerly wound up the rope now pays it out again, as follows: The pawl c being normally out of engagement with the ratchet-teeth, on the forward movement of said pawl it does not touch said ratchet-teeth until it strikes the roller f, which then forces the pawl down into engagement with the ratchet, and then by moving that pawl a little farther forward it is made to take the strain of the load and keep engaged with the ratchet-teeth by frictional contact while it moves back, the frictional contact being greater than the tension of the spring. The backward movement of the pawl then permits its ratchet-wheel to move backward with the load until the other pawl engages the ratchet-teeth on the other side, at which time the strain is taken off the first pawl, and the tension of its spring draws it away from the first ratchet-wheel to a position to move forward for a new hold. It will be seen, therefore, that through these instrumentalities a backward step-by-step movement is allowed the roller C for unwinding the rope.

I do not confine my invention to a gin, strictly considered, but may use it in connection with a derrick or other analogous device.

Having thus described my invention, what I claim as new is—

1. The combination, with two ratchet-wheels fixed rigidly to a shaft, of the two loose gears having pawls c c', with springs g, adjustable engaging devices H, for projecting the pawls into engagement with the ratchets, and the oscillating intermediate gear, F, meshing with the gears E E', substantially as and for the purpose described.

2. The combination, with the gin-timbers A A' and the roller C, journaled therein, of the rigid ratchet-wheel D, loose wheel E, with pawl c, arranged on one side of the gin-upright, and the rigid ratchet-wheel D' and loose wheel E', with pawl c', arranged upon the other side of the gin-upright, and the oscillating gear F, hung upon an axis at right angles between them and meshing with the loose wheels, as shown and described.

SAMUEL T. RICHARDSON.

Witnesses:
EDW. W. BYRN,
J. HOOPER SHEPHERD.